United States Patent [19]

Jachmann et al.

[11] Patent Number: 5,008,835
[45] Date of Patent: Apr. 16, 1991

[54] METHOD AND APPARATUS FOR STORING AND FORWARDING VOICE SIGNALS AND GENERATING REPLIES

[76] Inventors: Emil F. Jachmann, 13 High St., Greenwich, Conn. 06830; Jeremy Saltzman, 24 Highbrook Rd., Norwalk, Conn. 06851; David B. Chamberlin, 11 Hunter Ridge, Monroe, Conn. 06468; Nicholas A. D'Agosto, 68 Sterling Rd., Trumbull, Conn. 06611; Mark Harris, 64 Roger White Dr., New Haven, Conn. 06511; Jy-hong Su, 14 Hunters La., Norwalk, Conn. 06850

[21] Appl. No.: 138,417

[22] Filed: Dec. 28, 1987

[51] Int. Cl.⁵ .................... G10L 5/00; G06F 13/00
[52] U.S. Cl. .................... 364/513.5; 369/29; 364/900
[58] Field of Search .................... 381/29-53; 364/513.5; 369/83; 379/74, 88

[56] References Cited

U.S. PATENT DOCUMENTS

| | | |
|---|---|---|
| 3,749,849 | 7/1973 | Kolpek et al. |
| 4,430,726 | 2/1984 | Kasday |
| 4,446,336 | 5/1984 | Bethel et al. ............... 379/89 |
| 4,573,140 | 2/1986 | Szeto ............... 364/900 |
| 4,627,001 | 12/1986 | Stapleford et al. ............... 364/513.5 |
| 4,677,658 | 6/1987 | Kolodny |

Primary Examiner—Emanuel S. Kemeny
Attorney, Agent, or Firm—Robert H. Whisker; Melvin J. Scolnick; David E. Pitchenik

[57] ABSTRACT

A system for storing and forwarding voice signals. The system provides for central, digital storage of voice signals for later access by addressee system users. When addresses access a previously stored voice signal they have the capability to incrementally construct a reply by "toggling" between a playback state, to listen to the previously stored signal and a record state to record at least a partial response. In another embodiment originators of voice signals have the capability to edit signals after storage.

19 Claims, 5 Drawing Sheets

METHOD AND APPARATUS FOR STORING AND FORWARDING VOICE SIGNALS AND GENERATING REPLIES

BACKGROUND OF THE INVENTION

This invention relates to systems for storage and forwarding of voice signals, commonly known as voice mail systems. More particularly, it relates to voice mail systems where the addressee of a voice signal may respond to such signal by generating a reply voice signal which is automatically directed to the originator of the first voice signal.

Voice mail systems are well known. Typical of such systems are the systems described in commonly assigned U.S. patent application Nos. 013,303 and 013,304; both by A. Sweet et al. (DIC-536 and DIC-542), or those described in U.S. Pats. Nos. 4,371,752; 4,580,012; 4,581,486; 4,602,129; 4,640,991; 4,585,406; 4,652,200; and 4,580,016; all assigned to VMX, Inc. While such systems vary in capacity, and in particular capabilities offered, all share as a common subset of functions the ability to store messages intended for system users for later retrieval by those users. Each user is assigned a "mailbox" and may retrieve his messages by accessing the system and then identifying his "mailbox". In general, anyone having knowledge of the telephone numbers for the system, may leave messages, but only users having a "mailbox" may retrieve messages.

To retrieve messages a user of a typical voice mail system accesses the system over the telephone lines and, after identifying himself by mailbox number, and possibly a password, hears a recorded message produced by the system advising him of the status of his mailbox (e.g. number of messages waiting, etc.). The user may then listen to brief prerecorded portions of each message, commonly referred to as "headers" which further describe the message, for example, by identifying the originator. The user may then decide whether or not to listen to each message.

While successful for their intended purpose, such systems have many disadvantages. A particular problem arises when a system user wishes to generate a reply to a previously stored voice signal which is long and which may relate to a plurality of subjects and/or different points. In known voice mail systems a user may repeat a signal to which he or she is listening and may advance or back up to repeat or skip portions of the signal, however, in known systems once a user switches modes to generate a reply it is not possible to return to the stored message to which the user is replying without terminating the reply mode; either by sending the reply or erasing it. Thus, when replying to a long complex voice signal on previous voice mail systems, it is difficult for a user to organize a response and to be sure all points have been covered. Heretofore, a user might deal with by taking notes or simply relying on his or her memory. Or, he or she would reply to a stored voice signal, listen to it again, then, if necessary, generate a second, supplemental reply.

This problem is compounded by the limited editing capability prior voice mail systems provide. In general, if a user of a prior voice mail system was dissatisfied with a reply he or she generated the only alternative was to erase the reply and record a second, completely new reply.

Accordingly, it is an object of the subject invention to provide a voice mail system wherein a user may more efficiently respond to previously stored voice signals.

It is another object of the subject invention to provide a voice mail system which facilitates the creation of complex replies.

BRIEF SUMMARY OF THE INVENTION

The disadvantages of the prior art are overcome, and the above objects are achieved, in accordance with the subject invention by means of an apparatus for storing and forwarding of voice signals, which includes a voice mail system for storing and retrieving such voice signals, the system having a playback state for output of the voice signals retrieved from the voice mail system and a record reply state for input of reply voice signals in response to such retrieved voice signals. The system further includes station sets for input and output of voice signals, the station sets also having control signal inputs for input of at least first and second control signals; the first control signal causing the station set to exit the listen mode and enter the reply mode, so that a user of the apparatus may input at least a partial reply to a retrieved voice signal at any time during the listen mode; and the second control signal causing the station set to exit the reply mode and return to the listen mode.

In one embodiment of the subject invention the second control signal causes the voice mail system to resume output of the retrieved voice signal at substantially a point in the course of such output where the first control signal was input. In another embodiment of the subject invention successive reply voice signals input during one of such retrieve voice signals are concatenated to form a single reply voice signal.

Thus, it may be seen that the subject invention clearly overcomes the disadvantages of the prior art, and achieves the objects set forth above. Other objects and advantages of the subject invention will be apparent to those skilled in the art from consideration of the Detailed Description Of Preferred Embodiment set forth below and the attached drawings.

DETAILED DESCRIPTION OF THE PREFERRED EMBODIMENT

Figure 1:
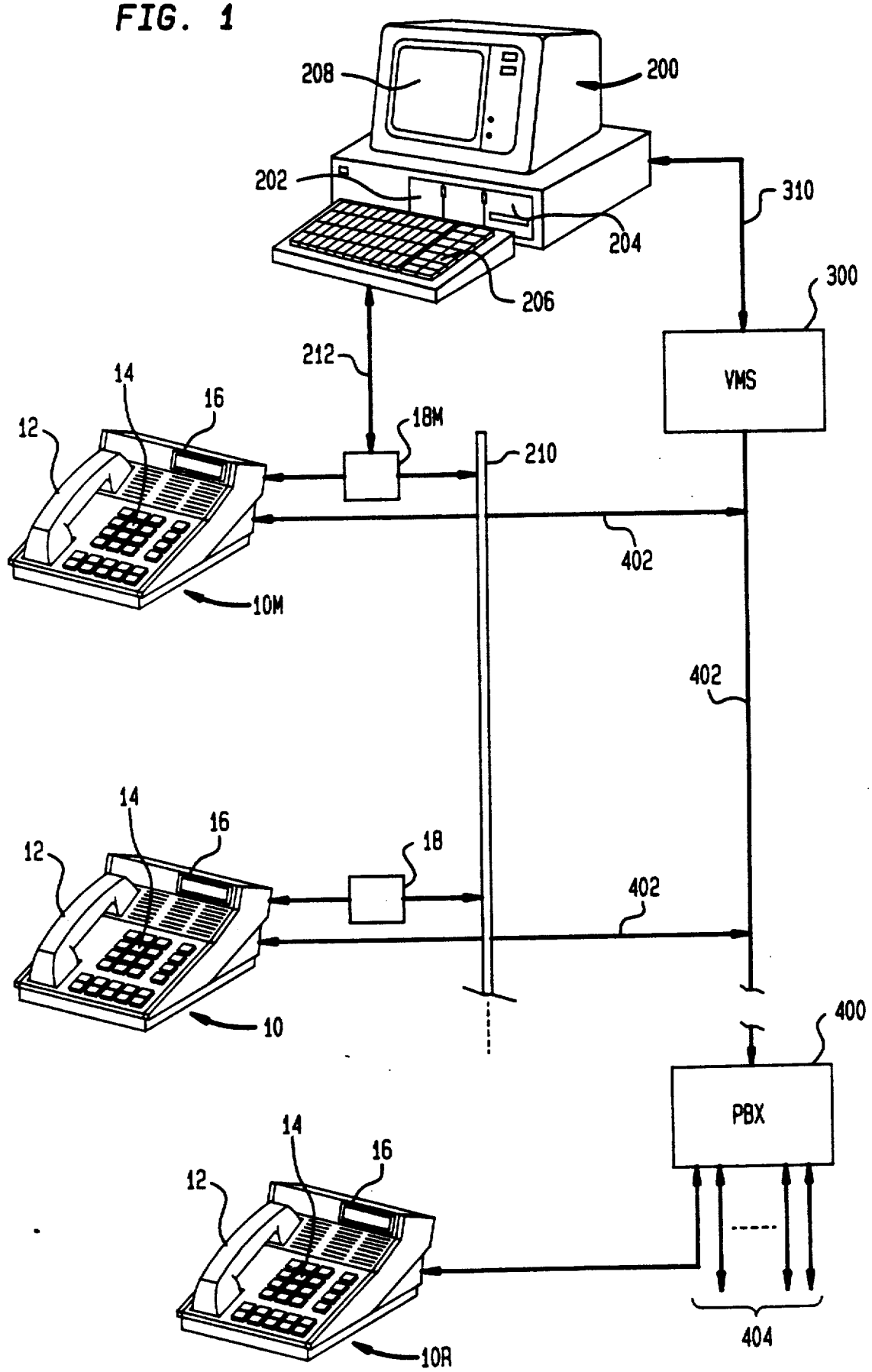
FIG. 1 is a schematic diagram of the system of the subject invention.

FIG. 1 shows a schematic diagram of a system in accordance with the subject invention. A plurality of telephone-like stations 10, including a master station 10m, provide input and output for voice signals through handset 12, input various control signals through keyboard 14 and display text messages on the display 16. The system may also comprise remote station 10r connected over the telephone system. Station 10m is connected through interface 18m to microcomputer 200. Computer 200 includes floppy disk drives 202, hard disk 204, keyboard 206 and CRT display 208, and is preferably a well known conventional microcomputer such as the IBM Model PC AT marketed by the IBM Corporation of Armonk, N.Y.

Computer 200 and station 10m are connected to digital data path 210 for the transmission of text messages and other digital information in a conventional manner well known to those skilled in the art. Data path 210 also provides a digital transmission path between stations 10 and computer 200.

Computer 200 is further connected to voice message system (VMS) 300 over a data link 310.

PBX 400 is connected to stations 10m, 10 and VMS 300 over internal telephone lines 402. Lines 402 allow transmission of voice signals to or from any of stations 10m, 10, and VMS 300, and PBX 400 in a conventional manner well understood by those skilled in the art. PBX 400 also allows connection of remote input devices such as station 10r and other conventional telephone stations to the system over external telephone network 404. PBX's are, of course, extremely well known devices for switching telephone signals whose operation is well understood by those skilled in the art and which need not be discussed further here for an understanding of the subject invention.

The above system is more fully described in the commonly assigned, co-pending U. S. patent application Ser. No. 128,254 entitled METHOD AND APPARATUS FOR VISUAL INDICATION OF STORED VOICE SIGNALS; by: D. Chamberlin et al. While the above described system is preferred for use with the subject invention, those skilled in the art will recognize that the subject invention may be readily adapted to any of the known commercially available voice store and forward systems such as those marketed by various ones of the regional telephone operating companies.

Figure 2:
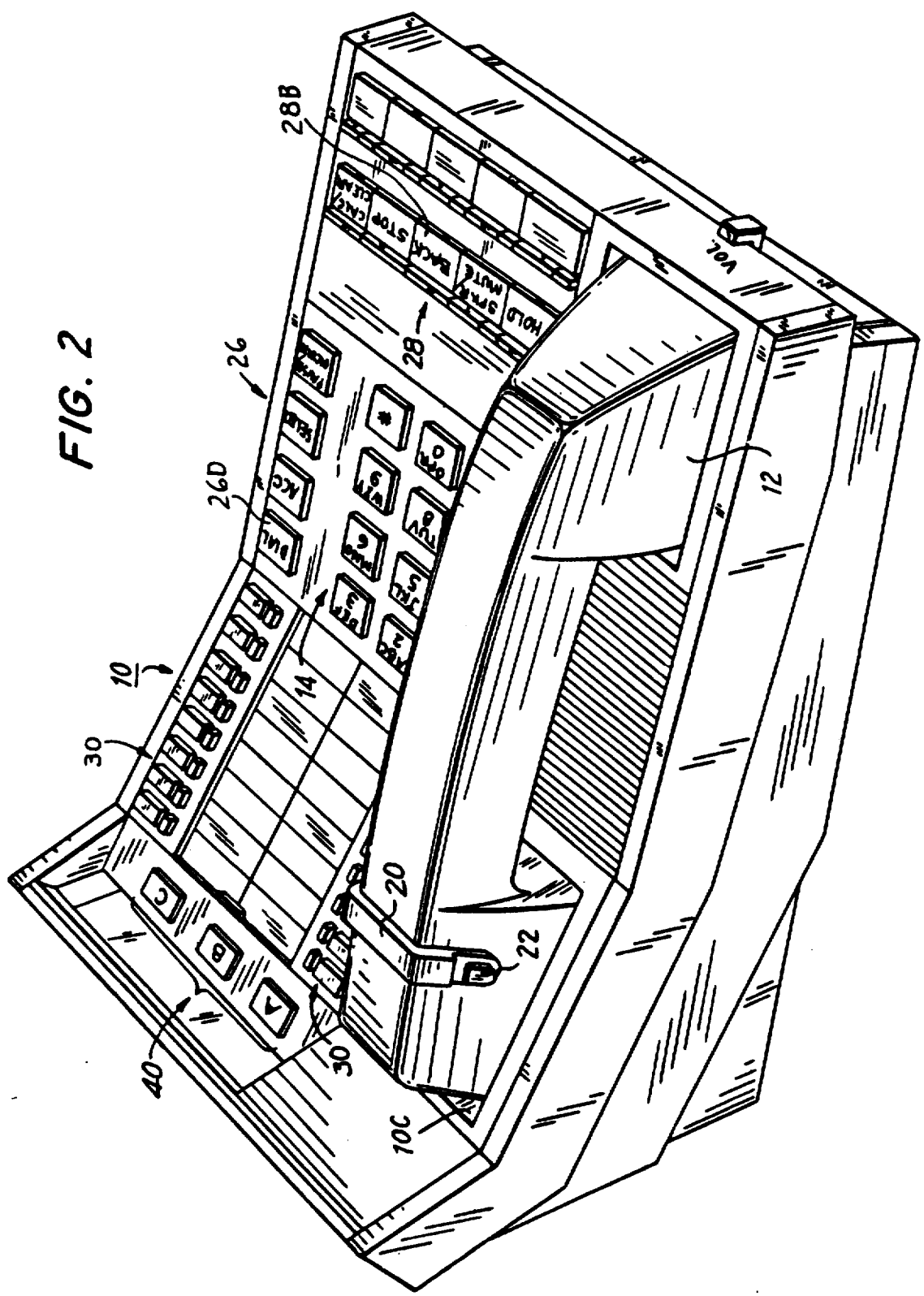
FIG. 2 is a perspective view of a station set used in conjunction with the subject invention.

FIG. 2 shows a perspective view of station set 10 in accordance with the subject invention. Set 10 is structurally substantially identical to the "C" units described in commonly assigned co-pending U. S. patent application Ser. No. 895,017; to: Chamberlin et al. (DIC-537). Station set 10 is provided with a handset 12 having a speaker and microphone, similar to handsets normally provided in conventional telephone instruments. Handset 12 is held in a cradle 10c integral to the top panel of station set 10, and which cradle includes a hook switch (not shown) whose function is substantially identical to the conventional hook switch normally provided in telephones. Handset 12 differs from conventional handsets in that it has a control yoke 20 and a control button 22. Yoke 20 and button 22 are useful when station set 10 is to be used with a dictation unit, as is more fully described in the above referenced commonly assigned patent application and are used in recording replies to stored voice signals as will be more fully described below. A handset such as handset 12 is shown in U.S. Pat. No. 3,872,263 assigned to the assignee of the present invention. On the top panel of station set 10 various keys are located, including conventional push button telephone keypad 14, preset function keys 26 and 28, user-programmable keys 30, and "soft" keys 40. Station set 10 further includes a conventional Dual Tone Multiple Frequency (DTMF) signal generator which generates control signal tones which may be transmitted over the telephone system to "dial" a telephone number or for the purpose of controlling various remote systems over the telephone system. These DTMF signals are used in accordance with the subject invention in a manner which will be described more fully below.

Those skilled in the art will, of course, recognize that station set 10 preferably will also include conventional telephony and dictation functions such as are commonly known and/or are described in the above referenced commonly assigned U.S. patent application, however, descriptions of such functions are, in general, not believed necessary to an understanding of the subject invention and will not be discussed further here except to such limited extent as they may interact with capabilities of the subject invention.

Figure 3:
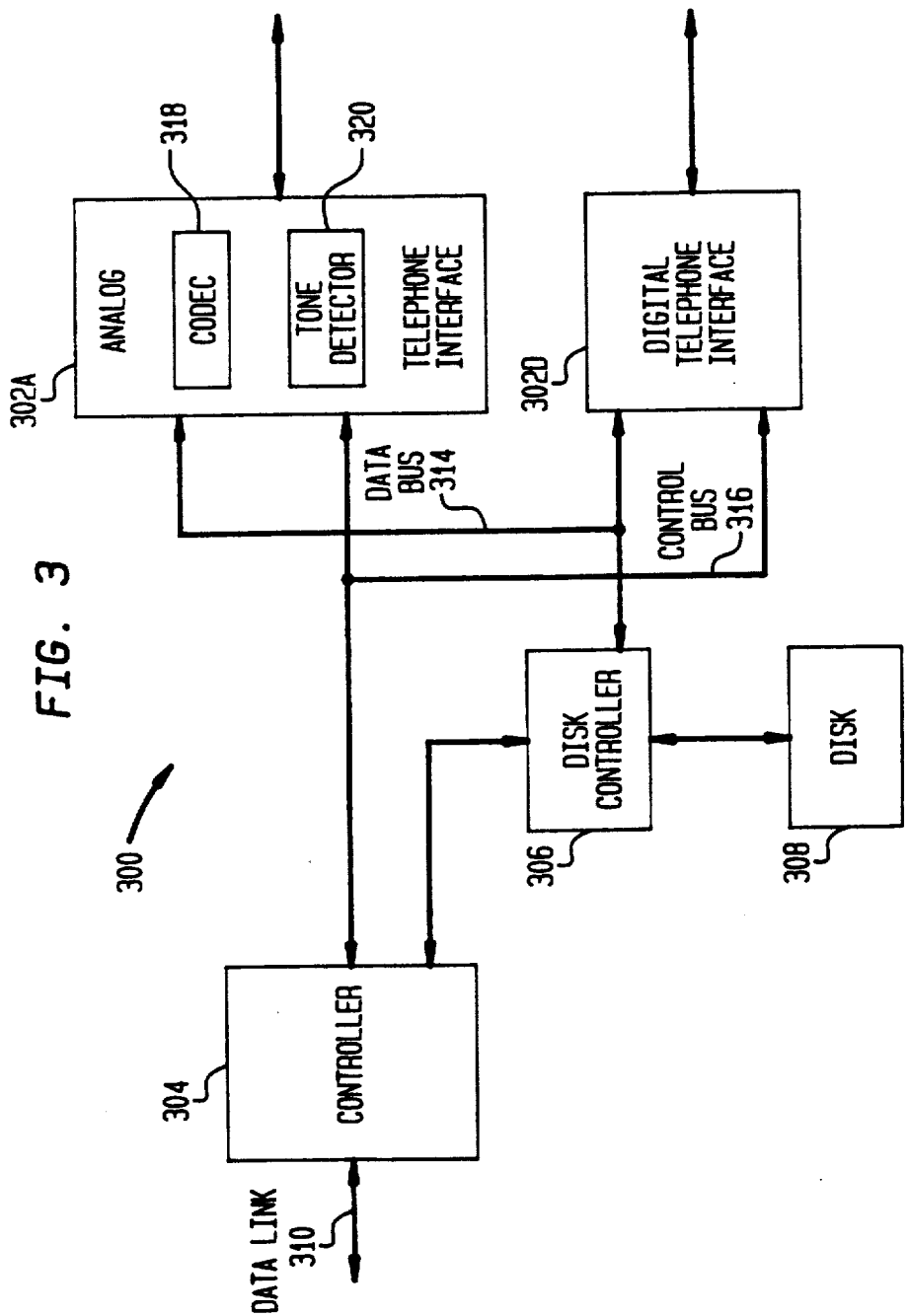
FIG. 3 is a schematic block diagram of a voice mail system used with the subject invention.

FIG. 3 shows a schematic block diagram of voice mail system 300. As noted above, voice mail system are known and the system of FIG. 4 will be described in simplified terms without reference to details of design which are not necessary for an understanding of the subject invention. Voice mail systems may be considered as comprising three essential elements; telephone interfaces 302, controller 304 and a mass storage device shown in FIG. 4 as a hard disk controller 306 and hard disk 308. Telephone interfaces 302 receive voice signals over telephone lines and convert them to appropriate digital format for storage and later retrieval on disk 308. Interfaces 302 also perform such conventional telephony operations such as ring detection, dial signal generation, etc. Interfaces 302 may be either analog, interface 302a; or digital, interface 302d. Analog interface 302a receives voice signals in analog form as well as control signals in DTMF form and includes a "codec", (a form of analog-to-digital convertor used in telephony) 318 and a tone detector 320 to convert the received signals to appropriate digital form. Digital interface 302d is designed to receive voice signals as well as control signals in a digital form specified by one of the various vendors of digital telephone equipment. In either case, control signals from interfaces 302 are transmitted to controller 304 over control bus 316 while voice signals, converted to an appropriate digital format are transmitted through disk drive controller 306 to disk 308 over data bus 314. Controller 304 responds to various control signals to control interfaces 302 and controller 306 to identify various voice signals with selected addresses and store them on disk 308 for later retrieval. Such operation of voice message systems is known and is described in the above referenced commonly assigned U.S. patent application Ser. Nos. 013,303 and 013,304 as well as the above referenced U.S. Pat. No. 4,371,752. While hereafter descriptions of the subject invention will be given in terms of DTMF signals, those skilled in the art will recognize that an all digital embodiment where tone control signals would be replaced by digital control signals would be well within the ordinary skill in the art.

Figure 4:
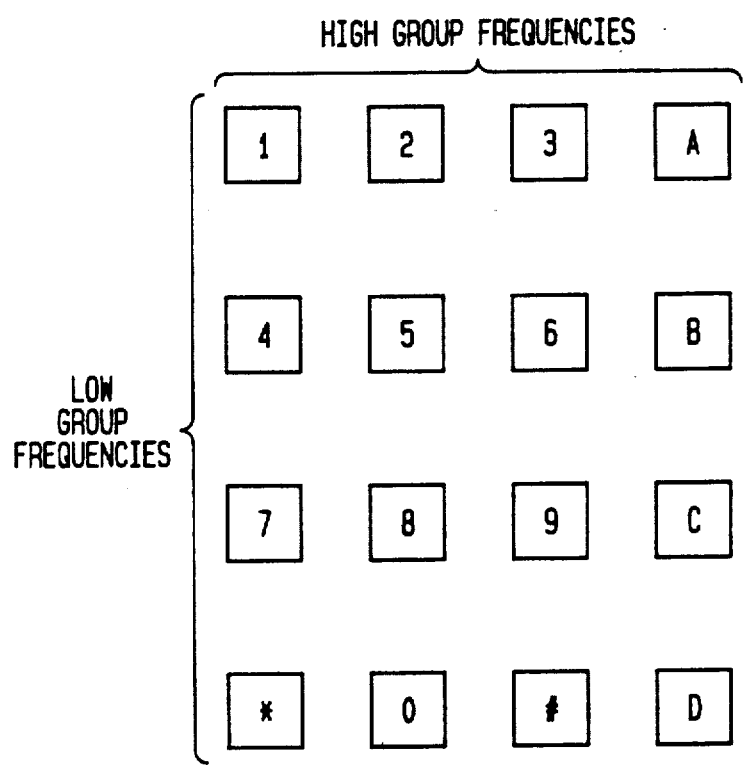
FIG. 4 is an illustration of a generalized DTMF telephone keyboard.

FIG. 4 shows a generalized DTMF keypad, such as is commonly used on conventional push button telephone sets. When any button in the keypad is depressed, two frequencies, one from a predetermined high group of frequencies, and one from a predetermined low group of frequencies are selected and combined to generate a unique tone signal. Each group of signals consists of four distinct frequencies; providing a total of 16 unique tones. Typically, telephone sets will only use three of the four frequencies in the high group to provide tones for the digits 0-9 and the "star" and "pound" keys; however, conventional commercially available tone generators and detectors will recognize all 16 tones, which are shown in FIG. 4 as additional keys a,b,c, and d.

Figure 5:
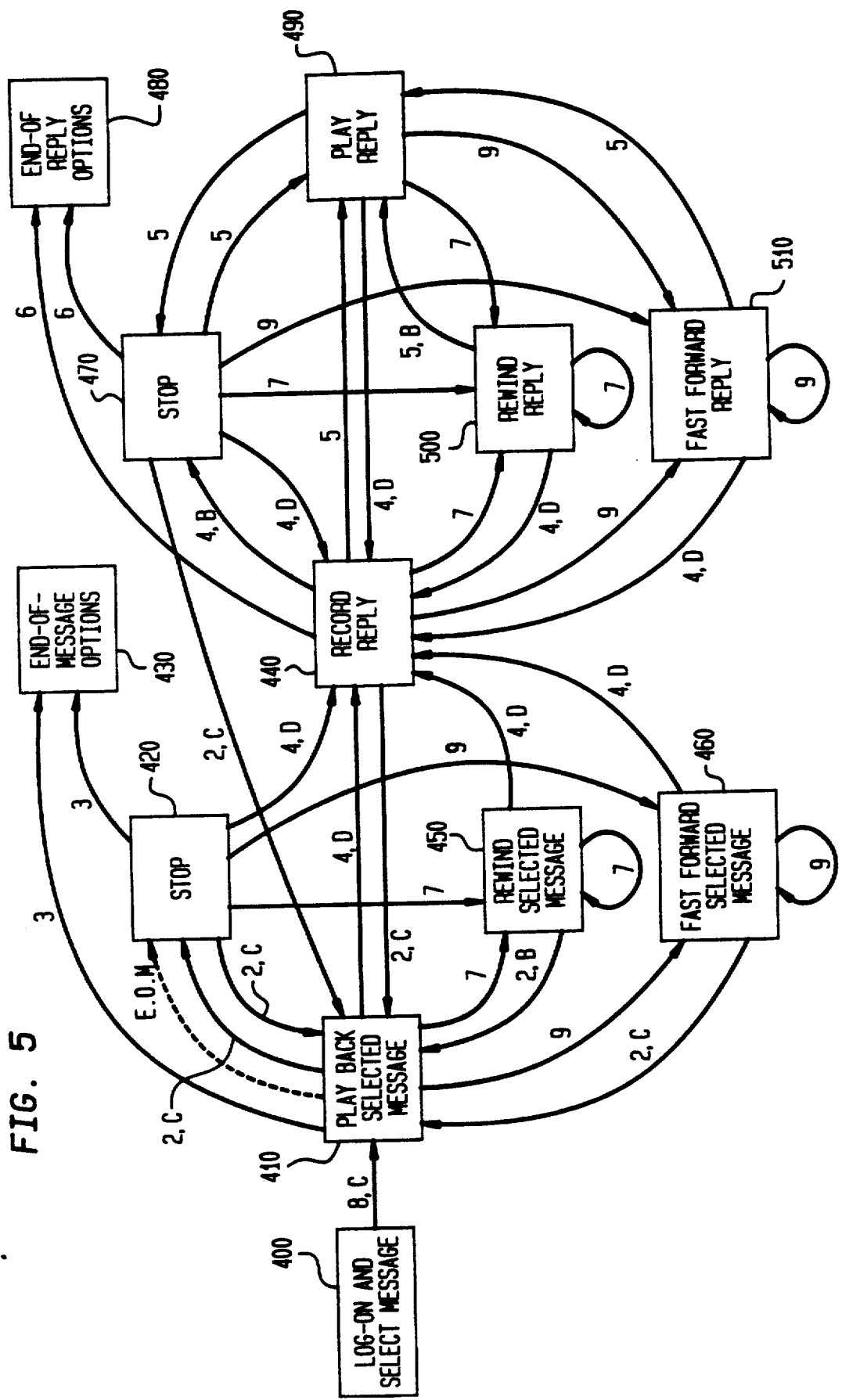
FIG. 5 is an illustration of the operation of the system of FIG. 1 in accordance with the subject invention.

In a preferred embodiment of the subject invention, tones b,c, and d are generated by yoke 20 and control button 22 to provide a particularly convenient manner of controlling voice mail system 304 in accordance with the subject invention. More particularly, DTMF tones are generated by yoke 20 and button 22 as follows:

Pressing button 22—generates a D tone
Releasing button 22—generates a B tone
Pushing yoke 20 up—generates a 7 tone
Pushing yoke 20 down—generates a C tone
Releasing yoke 20 from either position—generates a B tone FIG. 5 shows a state diagram of the operation of a system in accordance with the subject invention. In each state, the system performs a selected function. Thus, for example, in state 410 the system performs a playback function for a selected message. Those skilled in the art will recognize that the various functions carried out at each state shown in FIG. 5 are conventional functions which have been implemented in numerous commercially available voice mail systems and/or digital dictation systems; and that the sequence of transitions shown in FIG. 5 implements a novel and advantageous functionality not previously known. Accordingly, it is believed that a detailed description of the implementation of the various functions provided by the apparatus of the subject invention is not necessary for an understanding of the subject invention. It will also be understood by those skilled in the art that system 300 will preferably provide verbal and/or text prompts to a user for each new state to advise the user of the transitions available; and, possibly, of any intermediate inputs necessary to complete the function.

At 400 in FIG. 5, a user will log-on and select a message addressed to him or her for playback in a well known conventional manner. Log-on and selection of messages is a necessary and conventional part of all systems for storing and forwarding voice signals and the precise details of implementation do not form a part of the subject invention. Once a message is selected at 400, the user may enter state 410 to playback to the selected message by generating either a two tone by depressing the two button in keypad 14 or a C tone by pressing yoke 20 down. In state 410 VMS 300 will begin playback of the selected message and will continue until either the end of message is reached or the user inputs another control signal. When the end of the message is reached, system 300 will automatically transfer to stop state 420. The user may also transfer to state 420 at any time during playback in state 410 by generating another two or C tone.

Other transitions which may be made by the user are to the End-of-Message Options state 430, by generating a three tone; to Record Reply state 440 by generating either a four tone or a D tone, generated by depressing button 22 on handset 12; to Rewind Selected Message state 450 by generating a seven tone, either by pushing yoke 20 up or depressing the 7 button in keypad 14; or, to Fast Forward Selected Message state 460 by generating a nine tone.

Stop state 420 is an idle state which is preferably used to allow the user to review prompts of the available transitions. The user may return from Stop state 420 to Playback state 410 by again generating a two or C tone. Playback will then resume at, or slightly before, the point reached in the selected message when Stop was selected. Otherwise, the same transitions are available in Stop state 420 as are available in Playback state 410, so as to allow an experienced user to transfer directly from Playback state 410 and other users to Stop in state 420 and review the prompts.

When the user is satisfied that he has sufficiently reviewed the selected message, he or she may enter End-of Message Option state 430 by generating a three tone. State 430 is conventional and substantially similar to the operation of known commercially available systems for storing and forwarding voice mail messages, and allows the user to select various options for responding to the selected message. Typically, the selected message may be erased, forwarded to another user, saved, or the user may record a reply in a conventional manner. A further description of the details of the implementation of End-of-Message Option state 430 is not believed necessary to an understanding of the subject invention.

Record Reply state 440 may be entered either by generating a four tone from keypad 14 or a D tone by depressing button 22. In state 440 the user may record a reply in a conventional manner and the VMS 300 will automatically address such reply to the originator of the selected message and store it for later access. In state 440 the user may enter Stop state 470 by generating either a four tone through keypad 14 or a B tone by releasing button 22 from Record Reply state 440 the user may also transfer to Play Reply state 490 by generating a five tone; transfer to End-of-Reply Option state 480 by generating a six tone; transfer to Rewind Reply state 500 by generating a seven tone, either by depressing the 7 button on keypad 18 or pushing yoke 20 up; or, may transfer to Fast Forward Reply state 510 by generating a nine tone.

After generating at least a portion of a reply, the user may return to Playback state 410 by generating a two tone or a C tone and playback will resume at the point in the selected message at which the system left state 410. If the user then returns to Record Reply 440 and records a further reply, this further reply will be concatenated with the previously recorded reply. In this manner the user may "toggle" between Playback state 410 Record Reply state 440 to create a reply to a long and complex message.

In Rewind Selected Message state 450 the user may back up to a previous point in the selected message. Once in state 450 each time a burst of seven tone is received, system 300 will back up the current point in the selected message by a predetermined amount, preferably approximately three seconds. Note that preferably a single burst of tone is generated each time the 7 button is depressed in keypad 14 so that the 7 button must be repeatedly depressed to rewind the selected message by more than the predetermined amount, but that preferably the 7 tone generated by pushing up on yoke 20 is "chopped" into a series of bursts of tone so that effectively, the selected message is continuously rewound by pushing up on yoke 20. The user may transfer from Rewind Selected Message state 450 back to Playback state 410 by generating either a two or a B signal, or may transfer to Record Reply state 440 by generating either a four or a D signal. Since the B tone is generated when yoke 20 is released by using yoke 20, the user may effectively continuously rewind the selected message and resume playback at the new current point simply by pressing yoke 20 up and releasing it.

Fast Forward Selected Message state 460 moves forward in the selected message in substantially the same manner that state 450 moves back. However, only single bursts of tone may be generated by depressing the 9 key in keypad 14 and, accordingly, the nine key must be repeatedly depressed to fast forward more than a predetermined amount. The user may transfer to Playback state 410 by generating either a two or a C tone or to Record Reply state 440 by generating either a four or a D tone.

Stop state 470 is an idle state similar to Stop state 420 and is also preferably used to allow a user unfamiliar with the system to review the prompts for the available transitions. The user may transfer back to Record Reply state 440 by generating either a four or a D tone and resume recording the reply at the point he or she left off. Otherwise, the user may make the same transitions from Stop state 470 as from Record Reply state 440; thus, allowing the unfamiliar user to stop and review prompts for the available transitions.

End-of-Reply Option state 480 is entered from Record Reply state 440 or Stop state 460 by generating a 6 tone when the user considers his or her reply complete. End-of-Reply Option state 480 allows the user to select various options for the reply and would typically include saving the reply, erasing the reply and recording over it, or, sending the reply to the originator of the selected message. State 480 is conventional and substantially similar to the operation of known commercially available systems for storing and forwarding of voice signals and details of its implementation do not form part of the subject invention.

Play Reply state 490 allows the user to play the recorded reply at anytime before sending it. Play will begin at the point recording left off and, of course, in general, it will be necessary to rewind before entering Play Reply state 490 for the first time. From state 490 the user may return to Record Reply state 440 by generating either a four or a D tone, or may go to Stop state 470 by generating a five tone or may go to Rewind Reply state 500 by generating a seven tone, or may go to Fast Forward Reply state 510 by generating a nine tone.

In Rewind Reply state 500, system 300 operates to rewind the recorded reply in response to a seven tone in the same manner as the selected message is rewound in state 450. From Rewind Reply state 500 the user may return to Record Reply state 440 by generating a four or a D tone or may return to Play Reply state 490 by generating a 5 or a B tone. When system 300 returns to state 440 recording will resume at the new current point, and will be recorded over the previously recorded reply. Also, it should be noted that since the B tone returns system 300 to state 490 rewinding the reply by pushing up on yoke 20 will automatically cause system 300 to begin playing the reply when yoke 20 is released.

Fast Forward Reply state 510 functions to fast forward the recorded reply in response to a nine tone in the same manner that the selected message is fast forwarded in state 460. A user may go to Record Reply state 440 by generating either a four or a D tone; or may go to Play Reply state 490 by generating five tone. When a system enters Record Reply state 440 recording will resume at the new current point and any previously recorded reply will be overwritten.

The ability to rewind, fast forward and play the recorded reply and then to recommence recording and overwrite previously recorded reply, provides at least a limited editing capability. More extensive editing capability is described in commonly assigned U.S. patent application Nos. 013,303 and 013,304; referenced above, and incorporation of more extensive editing capabilities is within the contemplation of the subject invention.

The above description a preferred embodiment of the subject invention has been provided by way of illustration only, and those skilled in the art will recognize numerous other embodiments from the detailed description given above and the attached drawings. Thus, limitations on the scope of the claimed invention are to be found only in the claims set forth below.

What is claimed is:

1. Apparatus for storing and forwarding voice signals, comprising:
   (a) voice mail means for storage and retrieval of said voice signals, said voice mail means having a playback state for playback of selected voice signals and a record state for recording reply voice signals;
   (b) station means for input and output of said voice signals;
   (c) said station means further comprising signal input means for input of first and second control signals, said first control signal causing said voice mail means to exit said playback state and enter said record reply state, whereby a user of said apparatus may record reply voice signals to said selected voice signals at any point in said playback state, and said second control signal causing said voice mail means to exit said record reply mode and return to said playback mode.

2. Apparatus as described in claim 1 wherein said second control signal further causes said voice mail means to resume output of said selected voice signals at substantially the point where said first control signal was input.

3. Apparatus as described in claim 2 wherein successive ones of said reply voice signals input during one of said selected voice signals are concatenated to form a single reply voice signal.

4. Apparatus as described in claim 1 wherein said signal input means is further for input of a third control signal, said third control signal controlling said voice mail means to exit said playback state and enter a rewind selected message state to cause said voice mail means to return to a previous point in said selected voice signal, or controlling said voice mail system to exit said record reply state and enter a rewind reply state to cause said voice mail means to return to a previous point in said reply voice signal.

5. Apparatus as described in claim 4 wherein said voice mail means returns a predetermined increment of time in response to each activation of said third control signal.

6. Apparatus as described in claim 4 wherein said station means further comprises a handset including a speaker for output of said voice signals, a microphone for input of said voice signals and said signal input means includes switch means, mounted on said handset, for input of said third control signal.

7. Apparatus as described in claim 6 wherein said switch means comprises a momentary switch means and said control signal input means is responsive to continued activation of said momentary switch means to generate a sequence of activations of said third control signal, whereby said voice mail system apparently continuously rewinds said selected voice signal or said reply voice signal.

8. Apparatus as described in claim 4 wherein said signal input means is further for input of a fourth control signal, said fourth control signal controlling said voice mail means to exit said record reply state or said rewind reply state and enter a play reply state to cause said voice mail means to play said reply voice signal.

9. Apparatus as described in claim 5 wherein said signal input means is further for input of a fourth control signal, said fourth control signal controlling said voice mail means to exit said record reply state or said rewind reply state and enter a play reply state to cause said voice mail means to play said reply voice signal.

10. Apparatus as described in claim 9 wherein said control signal input means is further responsive to release of said momentary switch means to generate a fifth control signal, said fifth control signal controlling said voice mail means to exit said rewind selected message state and return to said playback state, or to exit said rewind reply state and enter said play reply state.

11. Apparatus as described in claim 1 further comprising means for editing said reply voice signal.

12. Apparatus as described in claim 11 wherein said editing means is further for returning to a previous point in said reply voice signal and recording a further reply voice signal over said reply voice signal after said previous point.

13. A method of generating a reply to a voice signal stored in a voice mail system, comprising the steps of:
 (a) inputting initial control signals to control said voice mail system to enter a playback state and to playback said stored voice signal; then
 (b) inputting a first control signal to control said voice mail system to exit said playback state and enter a record reply state and recording a reply voice signal; then,
 (c) inputting a second control to control said voice mail system to exit said record reply state and return to said playback state and resume playback of said stored voice signal.

14. The method of claim 13 wherein step b is repeated at least once and reply voice signals recorded during each execution of said step b are concatenated to form a single reply voice signal.

15. The method of claim 14 wherein, in step c, said voice mail system resumes playback of said stored voice signal at substantially the point said first control signal was input.

16. The method of claim 13 further comprising the step of repetitively activating a third control signal, each activation of said third control signal when said system was in said playback state controlling said voice mail system to return a first predetermined increment of time to a previous point in said stored voice signal and each activation of said third control signal when said system was in said record reply state controlling said voice mail system to return a second predetermined increment of time to a previous point in said reply voice signal.

17. The method of claim 16 further comprising the step, after cessation of activation of said third control signal:
 (a) when said system was in said playback state, returning to said playback state; or,
 (b) when said system was in said record reply state entering a play reply state and playing said reply voice signal from the point to which said voice mail system has returned.

18. The method of claim 13 further comprising the step of editing said reply voice signal.

19. The method of claim 13 wherein said editing step further comprises:
 (a) returning to a previous point in said reply voice signal; then,
 (b) recording a further reply voice signal over said reply voice signal from said previous point.

* * * * *